Patented Dec. 27, 1938

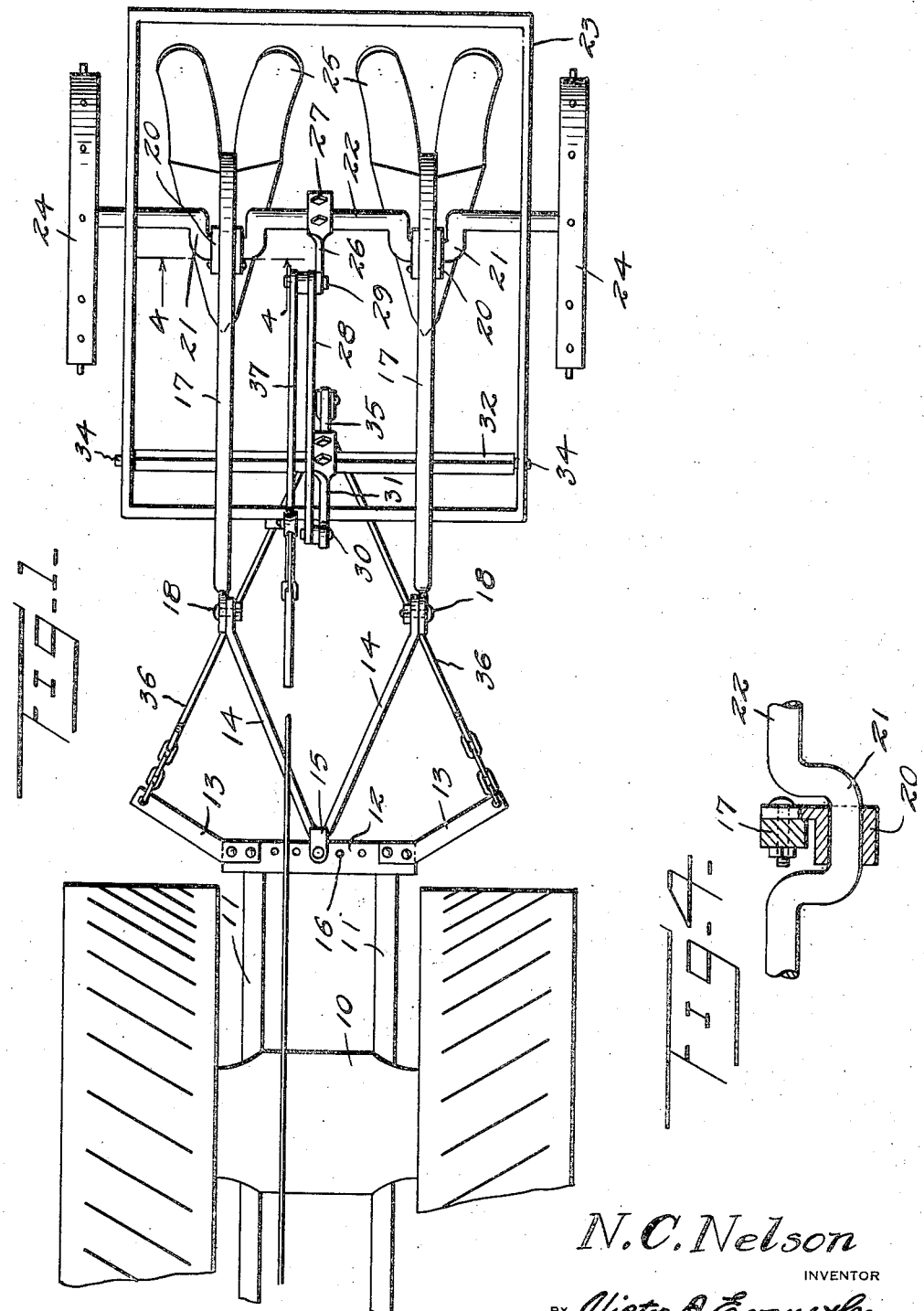

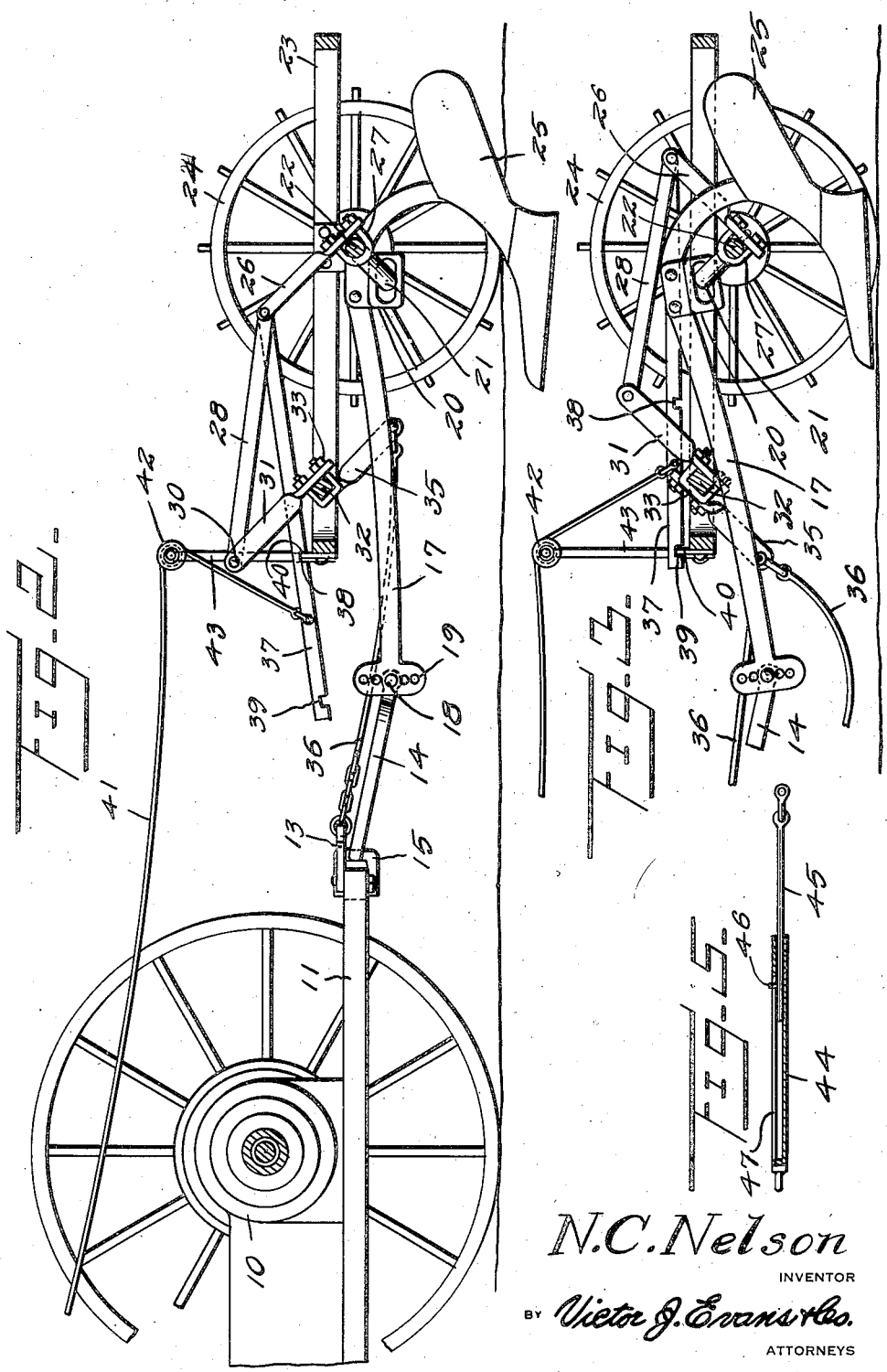

2,141,819

UNITED STATES PATENT OFFICE 2,141,819

AUTOMATIC POWER LIFT FOR AGRICULTURAL IMPLEMENTS

Nels C. Nelson, Bertrand, Nebr.

Application January 24, 1938, Serial No. 186,725

2 Claims. (Cl. 97—75)

This invention relates to an automatic power lift for agricultural implements and has for an object to provide a novel device wherein the power of the tractor is used to elevate the plows from the ground when a turn is to be made.

A further object is to provide an automatic power lift adapted to be controlled from the operator's seat and which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a plan view of an automatic power lift for gang plows constructed in accordance with the invention.

Figure 2 is a side elevation of the parts shown in Figure 1 with the plows in plowing position.

Figure 3 is a side elevation of the parts shown in Figure 1 with the plows elevated above the ground.

Figure 4 is a detail cross sectional view taken on the line 4—4 of Figure 1 showing the connection of one of the plow beams to the axle.

Figure 5 is a longitudinal sectional view showing a telescoping link connector which may be substituted for the cable and chain connector.

Referring now to the drawings in which like characters of reference designate similar parts in the various views, 10 designates a conventional tractor having frame bars 11. A draft bar 12 is secured transversely of the rear ends of the frame bars 11 and is provided at the opposite ends with outwardly extending arms 13 through which the power of the tractor is imparted to the hitch mechanism for lifting the plow from the soil when a turn is to be made.

A V-shaped draft tongue 14 is provided at its apex with a clevis 15 which is interchangeably received in a plurality of openings 16 formed in the draft bar 12. The rear ends of the branches of the draft beam are adjustably connected to the plow beams 17 by bolts 18 interchangeably received in openings 19 in the beams.

The plow beams are provided with bearings 20, best shown in Figure 4, which receive respective cranks 21 formed on the plow axle 22 which is supported in the plow frame 23 and is equipped with ground wheels 24 as usual.

For turning the axle on its axis and thereby raising or lowering the plows 25 carried by the crank arms of the axle, a lever 26 is rigidly secured at the lower end to the axle between the plow beams by means of a U-bolt 27. When the lever is swung forwardly beyond the vertical plane of the axle the cranks 21 are positioned to dispose the plows 25 in plowing position, as best shown in Figure 2. When the lever is swung rearwardly beyond the vertical plane of the axle the cranks are positioned to dispose the plows 25 above the ground in position for transportation or for turning at the end of a furrow.

To move the lever 26 a link 28 is pivotally connected at its rear end to the upper end of its lever by a pivot bolt 29. The forward end of the link is pivotally connected by a pivot bolt 30 to the upper end of a crank arm 31 which is bolted at the lower end to a rock shaft 32 by means of a U-bolt 33. The ends 34 of the rock shaft are journaled in the side members of the frame 23.

A second crank arm 35 is bolted at the upper end to the rock shaft and extends downwardly from the rock shaft. Cables 36 and 37 are connected at the rear ends to this downwardly extending crank arm 35 and are connected at the front ends to the rear ends of the outwardly extending arms 13 carried by the draft bar 12, as best shown in Figure 1.

It can now be seen that when the tractor is turning one of the cables on the side toward the turn will be slacked off while the cable on the side away from the turn will be tightened to turn the rock shaft 32 and through the instrumentality of the crank arm 31, link 28 and lever 26, turn the axle axially to lift the cranks 21 and elevate the plows above the soil.

When the turn has been completed the plow will have been turned to reverse its travel at which time the cables 36 will have resumed their normal condition and will transmit the power of the tractor to the rock shaft 32 to reverse the rotation of this shaft and lower the plows 25 to plowing position.

A latch bar 37 is pivotally secured at the rear end to the beforementioned lever 26 by the beforementioned pivot bolt 29 of the lever, as best shown in Figure 1. The latch bar extends forwardly beyond the front bar of the plow frame 23 and is provided in its lower edge with notches 38 and 39 which are adapted to interchangeably engage a stop plate 40 which rises from the front bar of the frame, as best shown in Figures 2 and 3. When the forward notch 39 is engaged with the stop bar, as best shown in Figure 3, the lever 26 will be held in position to hold the plows 25 raised. When the rear notch 38 is engaged with the stop plate 40 the lever 26 will be held in position to hold the plow 25 in plowing position, as best shown in Figure 2.

For controlling the device from the driver's seat of the tractor a cable 41 is located within convenient reach of the driver and is trained rearwardly over a pulley 42 disposed upon the upper end of a standard 43 which rises from the front bar of the plow frame 23. The extreme rear end of the cable is connected to the latch bar 37 intermediate the notches 38 and 39. When the driver pulls the cable 41 the latch bar will be released and the hitch will then be free to function as above described.

The cables 36 may be ropes, chains, or a combination of each. Or the cables may be dispensed with and connectors, shown in Figure 5, substituted. The connector shown in Figure 5 is formed of an extensible member comprising a tube 44 and a rod 45 telescopically engaged therein. The rod is provided with a stop pin 46 which works in a slot 47 formed in the side of the tube and when engaged with one end of the slot permits the tube to transfer draft from the tractor to the lower crank arm 35. When the rod is telescoped into the tube the connector is foreshortened to correspond to the position of a slacked off cable.

From the above description it is thought that the construction and operation of the invention will be fully understood without further explanation.

What is claimed is:

1. A device of the class described including a draft bar adapted to be mounted upon a tractor and to extend transversely thereof, outwardly and rearwardly extending arms of the ends of the bar, a draft tongue connected to the bar between the arms, a wheeled axle on the frame having cranks, plows having beams carried by respective ones of said cranks and connected to said draft tongue, a lever fixed to the axle between the cranks and extending upwardly from the axle, a rock shaft carried by the frame and having oppositely directed crank arms, a link connecting one of said crank arms with said levers, and connectors connected to the ends of said upwardly and rearwardly extending arms of the draft bars and to the other of said crank arms for rocking the crank shaft, tightening of either of said connectors and simultaneously slacking off of the other connector by power of the tractor raising the plows from the ground.

2. A device of the class described including a draft bar adapted to be mounted upon a tractor and to extend transversely thereof, outwardly and rearwardly extending arms on the ends of the bar, a draft tongue connected to the bar between the arms, a wheeled axle on the frame having cranks, plows having beams carried by respective ones of said cranks and connected to said draft tongues, a lever fixed to the axle between the cranks and extending upwardly from the axle, a rock shaft carried by the frame and having oppositely directed crank arms, a link connecting one of said crank arms with said levers, connectors connected to the ends of said upwardly and rearwardly extending arms of the draft bars and to the other of said crank arms for rocking the crank shaft, tightening of either of said connectors and simultaneously slacking off of the other connector by power of the tractor raising the plows from the ground, and a latch bar pivotally connected to the lever carried by the axle and having notches in an edge thereof, a stop carried by said frame adapted to be interchangeably engaged in said notches to hold said plows raised or to hold said plows in plowing position, and a manually operable cable connected to said latch bar for lifting the latch bar out of engagement with said stop to permit raising or lowering of the plows.

NELS C. NELSON.